United States Patent Office 3,376,485
Patented Apr. 2, 1968

3,376,485
CONTROL SYSTEM FOR POLYPHASE INDUCTION MOTORS
Iwao Shibata, Tokyo, and Nobuo Kawashima and Yuzo Yamaguchi, Yokohama, Japan, assignors to Toyo Denki Seizo Kabushiki Kaisha, Chuo-ku, Tokyo, Japan
Filed June 25, 1965, Ser. No. 466,888
Claims priority, application Japan, July 2, 1964, 39/37,527
6 Claims. (Cl. 318—227)

ABSTRACT OF THE DISCLOSURE

A control system for a star connected polyphase induction motor in which a ring connection of controlled rectifiers are connected to the primary winding of the motor at the neutral point thereof so that control of the motor is effected by the adjustment of the firing angle of the controlled rectifiers, the rectifiers being controlled to be individually fired to obtain a dynamic brake character and being controlled as regard their firing angles to control the braking effort.

---

This invention is concerned with speed control systems for induction motors and particularly with those for polyphase induction motors having a star connection of primary or secondary windings and including a ring connection of silicon controlled rectifiers corresponding in number to the phases to said motor windings and connected to the neutral point of said star connection of the motor windings, the arrangement being such that said silicon controlled rectifiers are adjustable in firing angle so as to control the speed and other operating conditions of the induction motor, one of said silicon controlled rectifiers being also firable separately to give a dynamic brake characteristic to the motor without altering the main circuit connection thereof.

The present invention has as an object to provide a novel speed control system of the type described which gives speed-torque characteristics of the shunt characteristic.

The above and other objects and features of this invention will become apparent by reference to the following description taken in conjunction with the accompanying drawings, in which.

Figure 1:
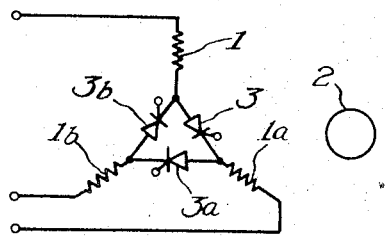
FIG. 1 illustrates one form of the main circuit connection in the speed control system of the present invention.
Figure 2:
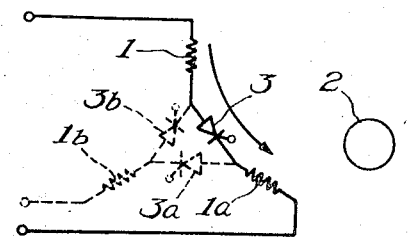
FIG. 2 illustrates the firing of a particular silicon controlled rectifier in FIG. 1.

Referring to the drawings and first to FIG. 1, reference numerals 1, 1a and 1b indicate the respective primary windings of an induction motor; 2 indicates the cage or wound rotor of the motor; and 3, 3a and 3b indicate respective silicon-controlled rectifiers hereinafter referred to as SCR forming a ring connection at the neutral point of the star connection of the primary windings 1, 1a and 1b. It will be noted that the motor torque can be varied to control the speed of the motor by firing the SCR's 3, 3a and 3b at respective appropriate firing angles and regulating their phase angles to control the current flowing through the primary windings 1, 1a and 1b of the induction motor. At speeds below synchronous, however, the induction motor inherently cannot have any braking character even if the firing angles of the SCR's are controlled. To overcome this situation, one of the SCR's should be selected to fire. For example, in case only the SCR 3 is fired at an appropriate firing angle with the remaining SCR's 3a and 3b left unfired, current is allowed to flow only through the circuit including the SCR 3 and the adjacent primary windings 1, 1a, as indicated by the arrow in FIG. 2. With the circuit forming a so-called single-phase halfwave rectifier circuit, the induction motor can produce a negative torque even at speeds below synchronous including those close to zero just in the same manner as in the conventional dynamic braking of an induction motor effected by passing DC currents through its primary windings.

Figure 3:
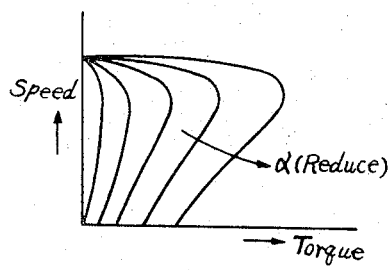
FIG. 3 illustrates the motoring or positive-torque side speed-torque characteristics obtainable with the system.
Figure 4:
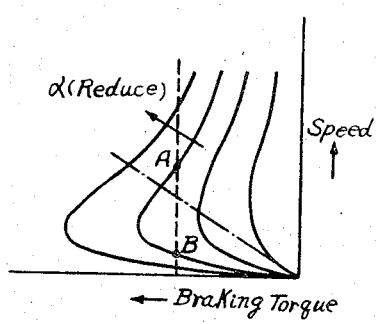
FIG. 4 illustrates the braking or negative torque side speed-torque characteristics obtainable with the system.

Description will next be made for the relationships between the speed and torque of the induction motor obtainable by varying the firing angle of the SCR's as a parameter in controlling the motor speed. As shown in FIG. 3, on the motoring or positive torque side the speed-torque characteristics of the induction motor exhibit a so-called falling character indicating that the motor operation cannot be stable at low speeds or at light load. On the other hand, the induction motor exhibits speed-torque characteristics as shown in FIG. 4 on its braking or negative torque side, indicating that at high speeds the braking torque of the motor is characteristically reduced with increase in speed. It follows, therefore, that no stable operation can be maintained with ordinary loads.

The reason for this will be described in further details with particular reference to FIG. 4, now assumed that the motor has a load characteristic curve as shown in the dotted line in FIG. 4, the load in this instance delivering a drive power to the motor, and that the motor is now running at a definite firing angle at the speed and torque of point A.

Then, if the motor speed falls due to some external disturbance, since the torque absorbed by the motor increases despite of the constant torque being delivered by the load, the motor speed is reduced as a result the difference in magnitude between the torque being delivered by the load and that absorbed by the motor increases more and more and the motor speed is thus reduced at an increasing rate until the point B in FIG. 4 is reached. This means that the point A is an unstable point. The motor behavior when its speed increases due to some external disturbance will be similar to that described above but in this case opposite thereto, and the motor speed will be increased at an increasing rate precluding any stable operation of the motor.

The above disclosure applies likewise to the case in which the load characteristic curve of the motor is such as indicated by the dot-dash line in FIG. 4, and also in this case the running state of the motor is unstable, as will readily be understood.

In the motoring region shown in FIG. 3, it will be apparent that the motor running becomes unstable at low speeds just as in the braking region described above.

Figure 5:
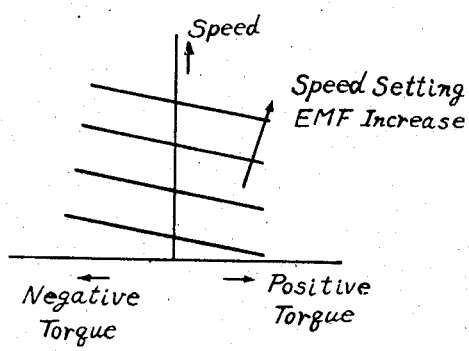
FIG. 5 illustrates the speed-torque characteristics obtainable according to the present invention and of the shunt characteristic throughout the positive and negative torque regions.

According to the present invention, there is provided a novel speed control system for a polyphase induction motor which is free from the above deficiencies and has capabilities comparable with those of known speed control systems such as the Ward-Leonard system and of the so-called "Schräge" motor. With the speed control system of the present invention, control is made so that, as the motor speed rises in the positive torque region, the powering torque is decreased and in the negative torque region the braking torque is increased with the increase of motor speed, while at the same time giving speed-torque characteristics which are of the shunt character of limited speed regulation throughout the positive and negative torque regions, as illustrated in FIG. 5. Also with the system, the motor speed can be varied freely in a stepless manner by varying the speed setting of the system.

Figure 6:
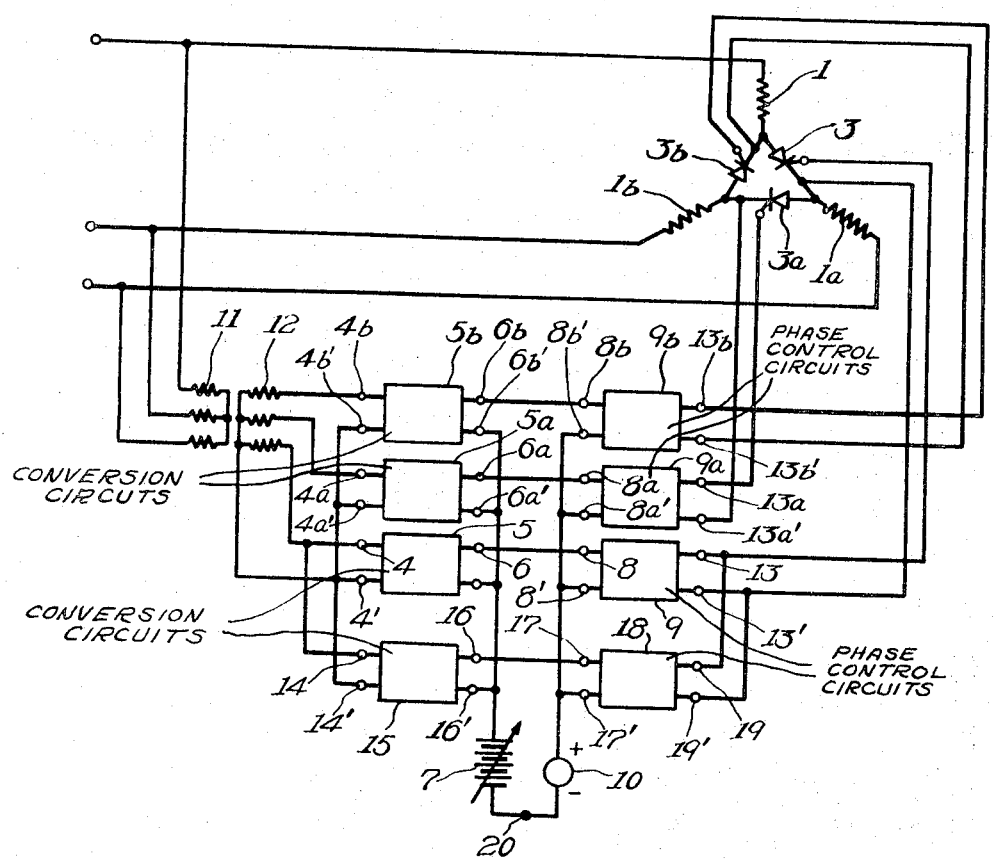
FIG. 6 is a schematic circuit diagram of a speed control system embodying the present invention.

Reference will now be made to FIG. 6, which illustrates an application of the present invention to a three-phase induction motor and in which parts corresponding to those shown in FIG. 1 bear the same reference numerals.

In the control circuit shown in FIG. 6, reference numerals 5, 5a and 5b indicate conversion circuits each having input terminals 4, 4′ or 4a, 4a′ or 4b, 4b′ and output terminals 6, 6′ or 6a, 6a′ or 6b, 6b′. The conversion circuits each function to produce at its output terminals a saw-tooth wave EME as shown in A FIG. 7 which is synchronized with the power source voltage through a transformer having primary and secondary windings 11 and 12. Such conversion circuits are well known to those skilled in the art and require no amplification as to their details. The saw-tooth waves EMF's obtainable at the outputs of the conversion circuits are shifted with respect to each other by an angle of 120° since the phases of the three-phase voltage impressed on the input terminals of the respective conversion circuits 5, 5a and 5b have phase angles shifted with respect to each other by 120°. It is to be understood that the wave A shown in FIG. 7 is the one obtained, for example, by the conversion circuit 5.

Figure 7:
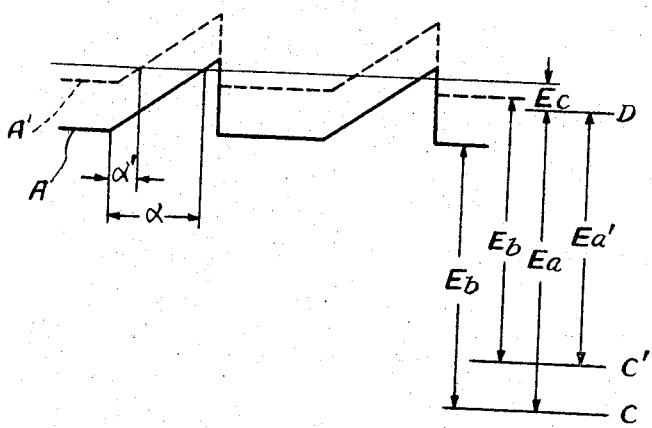
FIGS. 7, 8, 9 and 11 illustrate voltage wave forms appearing in the system according to the invention.

Reference numeral 7 indicates a variable speed-setting EMF connected to the output terminals 6′, 6a′ and 6b′ and having an EMF value of Eb (FIG. 7). The potential at point 20 on the other side of the variable speed-setting EMF 7 is indicated by C in FIG. 7. A pilot generator 10, coupled with the rotor of the induction motor, has its output in series connection with the EMF 7 but in opposite polarity thereto. Assuming that the pilot generator 10 has an EMF value of Ea, the potential at its terminal 8′ is the line D in FIG. 7. Thus, a saw-tooth wave EMF such as indicated by A in FIG. 7 and having a base potential D is impressed across the terminals 8 and 8′ (FIG. 6), which will be described below.

The circuit arrangement of FIG. 6 also includes phase control circuits 9, 9a and 9b each having input terminals 8, 8′ or 8a, 8a′ or 8b, 8b′ and output terminals 13, 13′ or 13a, 13a′ or 13b, 13b′. As illustrated, one of the input terminals 8, 8a or 8b of each phase control circuit 9, 9a or 9b is connected to one of the output terminals 6, 6a or 6b of the associated one of the conversion circuits 5, 5a or 5b. Such phase control circuits are well known to those skilled in the art and require no amplification as to their details. In operation, it is so established that, when the voltage appearing across the input terminals of the phase control circuits 9, 9a and 9b exceeds the specific value of Ec against the potential of 8′ (FIG. 7), an output signal appears across the output terminals 13, 13′, 13a, 13a′ and 13b, 13b′ to be fed to the firing gates of the SCR's 3, 3a and 3b so that the latter are fired in each cycle at the same phase angle. Now assume that the induction motor is delivering a positive torque and its speed is reduced with load increase. Then, as the ouput voltage of the pilot generator 10 is reduced, say, to Ea′ in FIG. 7, the potential C at point 20 is reduced, say, to C′ with the speed-setting EMF Eb remaining unchanged and thus the saw-tooth EMF wave is shifted to A′. Further, in this case, the firing phase angle α is varied to α′ as shown in FIG. 7 since the value Ec also remains unchanged. In other words, when the motor speed is reduced, the firing phase angle is reduced and the current flow through the SCR's is increased to increase the motor torque so that the motor is again balanced to restore a stable running state at a slightly reduced speed.

Similarly, when the motor load is reduced, the firing phase angle α is increased while the output torque of the motor is reduced so that the motor is again balanced at a slightly increased speed.

Reduction in the speed-setting EMF Eb has the same effect as that of increase in the output EMF of the pilot generator. In other words, in this case the firing phase angle is increased to reduce the primary currents of the induction motor. Similarly, increase in the speed-setting EMF Eb causes increase in the motor speed, as will be readily understood. It will be appreciated that by continuously controlling the speed-setting EMF Eb, the speed of the induction motor can be controlled in a stepless fashion.

Namely, as an important feature of the speed control system of the present invention, the inducton motor can have speed-torque characteristics of the shunt characteristic in the positive torque region, as shown in FIG. 5, and also can be controlled in a stepless fashion.

As another important feature of the present speed control system, provision of a further conversion circuit 15 and a further phase control circuit 18 as shown in FIG. 6 furnish the speed-torque characteristics of the motor with a shunt characteristic also in the braking or negative torque region.

Figure 8:
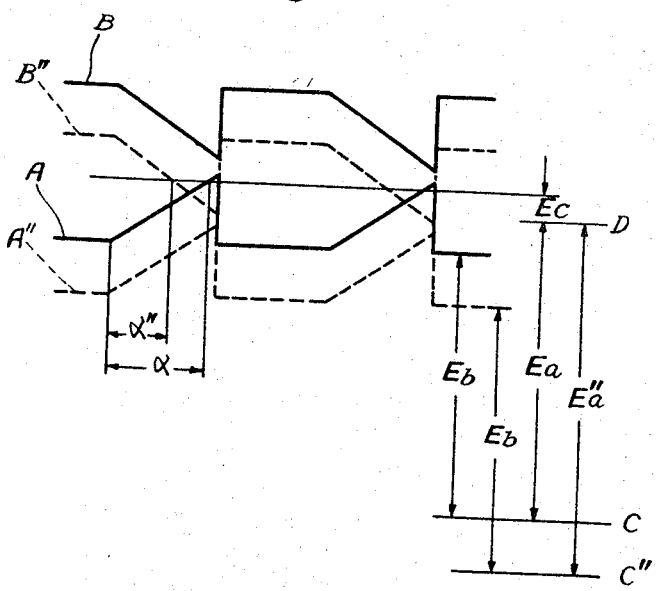

The conversion circuit 15 has input terminals 14 and 14′ across which an input voltage the same as that applied to the conversion circuit 5 is applied, as observed in FIG. 6, to produce across output terminals 16 and 16′ a saw-tooth wave EMF B similar but opposite in polarity to the saw-tooth wave EMF A, as shown in FIG. 8. It is to be understood that the potential relationship between the waves A and B is such that the wave B has a minimum potential value which is close to the maximum potential value of the wave A, as illustrated. The output of the conversion circuit 15 is superposed onto the combined EMF of the speed-setting EMF 7 and the pilot generator 10 and as such applied across the input terminals 17 and 17′ of the phase control circuit 18. Then the phase-control circuit 18 produces an output signal across its output terminals 19 and 19′ when the value of input voltage applied across its input terminals 17 and 17′ reduced below Ec. It is to be understood that the signal is fed to the gate of the SCR 3 as a firing gate signal to fire the SCR 3 in each cycle at the same phase angle.

In FIG. 8, the wave A exceeds the value of Ec at the phase angle α and thus the SCR 3 is fired at the firing phase angle α. Both the remaining SCR's 3a and 3b also fire at their respective firing angles, and the induction motor produces a positive torque. Also, in this case the wave B never falls below the value Ec and thus no gate signal is generated by the phase control circuit.

Assume that the motor receiving a torque from the load is accelerated. In this case, the output EMF Ea of the pilot generator 10 is increased the Ea″ and the potential C at point 20 is shifted to C″ (FIG. 8). However, the speed-setting EMF Eb remaining unchanged, the potential of the wave A is displaced to A″ and that of the wave B to B″. In the case of FIG. 8, the wave A″ never exceeds the value Ec, which remains constant, and, therefore, the phase control circuit produces no gate signal. Likewise, no gate signal is produced in this case by the other phase control circuits 9a and 9b.

On the other hand, since the wave B″ falls below the value Ec at the phase angle of α‴, the phase control circuit 18 produces an output signal which is fed to the gate of the SCR 3 to fire the latter in each cycle at the same phase angle. In other words, only SCR 3 fires in this case with the remaining SCR's 3a and 3b allowing no current flow therethrough. As a consequence, the motor produces a negative torque, as described hereinbefore.

Now assume that the torque of the motor load, which in this case is delivering such torque, is increased to raise the speed of the motor. Then the output EMF Ea″ of the pilot generator 10 is further increased so that, as will readily be understood from FIG. 8, the waves A″ and B″ are further lowered to further decrease the firing phase angle α″ of the SCR 3. Since decrease in the firing phase angle causes the motor to absorb a larger torque, as seen in FIG. 3, the motor is again balanced to restore a stable running state at a slightly higher speed. Similarly, reduction in torque of the motor load increases the firing phase angle α″ so that the motor torque of the braking character is reduced to balance the motor These behaviors of the motor mean that it has speed-torque characteristics of the shunt character.

Next, reduction in the output value of the speed-setting EMF 7, having the same effect as reduction in output of the pilot generator, decreases the firing phase angle so that the motor speed is reduced for the same load torque, as will be readily observed from FIG. 3. On the other hand, increase in the output value of the speed-setting EMF 7 raises the speed of the motor. It will thus be apparent that the motor speed can be controlled in a stepless manner even on its braking or negative torque side by controlling the speed-setting EMF 7 steplessly.

Figure 9:
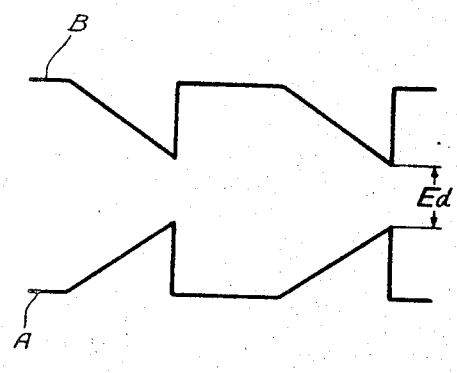
Figure 10:
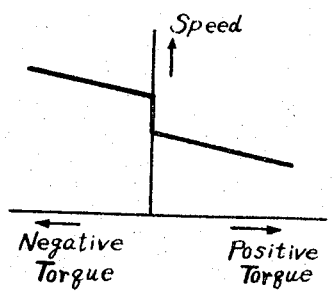
FIG. 10 illustrates the speed-torque characteristics corresponding to the potential relationship between the waves shown in FIG. 9.

Now assume that the motor torque is caused to vary from a positive to a negative value while maintaining the output value of the speed-setaing EMF 7. During the time when the motor is running and producing a positive torque, the SCR's 3, 3a and 3b are being fired by the gate signals deriving from the waveform A. In this case, as the motor speed is increased, the waves A and B are both lowered in FIG. 8 to decrease the positive motor torque and when wave A never exceeds the potential value Ec, the motor torque is reduced to zero. As the motor speed continues to rise, the wave B comes to fall below the potential Ec once for each cycle. This causes a firing gate signal to fire the SCR 3 and the motor is caused to run as a brake delivering a negative torque. Continuing rise of the motor speed further lowers the wave B to increase the negative torque of the motor. In this case, as apparent from the foregoing description, the motor exhibits speed-torque characteristics of the shunt character of limited speed regulation throughout the positive and negative torque ranges, as shown in FIG. 5. Thus, in cases where the waves A and B have a relationship of potential difference as indicated by Ed in FIG. 9, it will be readily understood that the speed-torque characteristic curve of the motor with the speed-setting EMF 7 fixed at a definite value is stepped at the torque value of zero, as shown in FIG. 10.

Figure 11:
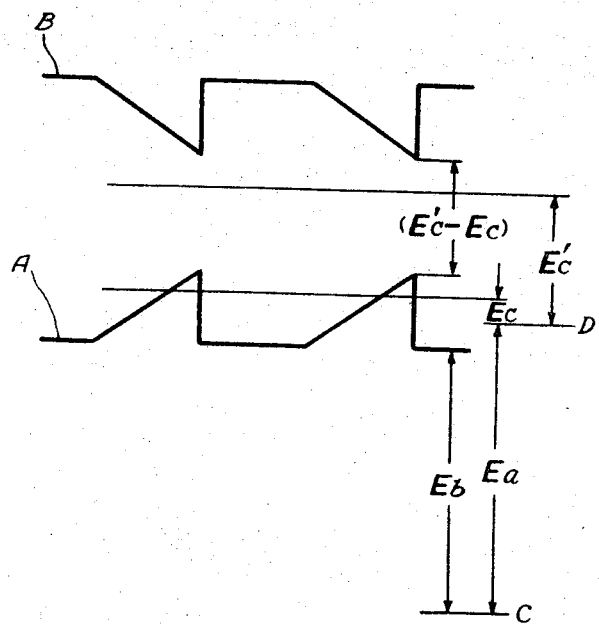

With the present speed control system, it is not always necessary that all of the phase control circuits 9, 9a, 9b and 18 produce output gate signals at the same voltage Ec. Thus, the same operation as illustrated in FIG. 8 can also be obtained, for example, by an arrangement in which the phase control circuits 9, 9a and 9b produce firing gate signals when the voltage Ec is exceeded while the phase control circuit 18 produces a firing gate signal when its output voltage drops below different voltage value Ec′, as long as the waves A and B are formed to have a potential difference therebetween which is larger than that shown in FIG. 8 by a value of (Ec′−Ec), as shown in FIG. 11. That is, the conversion circuit 15 is only required to be designed to produce a wave such as shown in FIG. 11 at B.

Though the waves A and B have been described herein as a saw-tooth wave, it will be apparent that they may take any other wave form as long as they function in the same manner as described.

Though a few embodiments have been described and shown herein which are designed to furnish speed-control for an induction motor in a manner such that it exhibits shunt characteristics, the pilot generator 10 may also be replaced by any other means which produces a voltage proportional to the value to be controlled, e.g., the torque or output power of the motor. For instance, in the event that a device is employed which produces a voltage proportional to the motor torque, it is possible to control the motor in such a manner that a virually constant torque is produced throughout the positive and negative torque regions and that the magnitude of such torque is made controllable by adjusting the torque-setting EMF.

Furthermore, the transformer 11, 12 in the circuit arrangement of FIG. 6 may be omitted if desired since they are only intended to transmit the frequency and phase angle of the power source to the circuitry.

Though description has been made herein in connection with a three-phase induction motor, it will be apparent that the present invention is also applicable to any other plural number of phases.

What is claimed is:

1. A speed control system for a polyphase induction motor having a star connection of primary windings and including a ring connection of controlled rectifiers corresponding in number to the phases of said motor windings and connected to the neutral point of said star connection of the motor windings, the arrangement being such that said controlled rectifiers are adjustable in firing angle to control the speed and other operating conditions of the motor and one of said controlled rectifiers is also firable separately to give a dynamic braking character to the motor without altering the main circuit connection thereof, said system comprising conversion circuits for producing potential waves of saw-tooth form synchronized with the power source, a speed-setting EMF device, a pilot generator for producing an EMF proportional to the speed or slip of the motor, and phase control circuits having an input voltage in the form of a superposition of said saw-tooth wave on the differential potential between said speed-setting EMF and said pilot generator and operable to produce output gate signals when the input voltage exceeds a predetermined value to fire said controlled rectifiers, said phase control circuits being arranged so that during motoring operation of the motor the phase angles of said output gate signals are retarded with increase in speed of the motor and during braking operation thereof said phase angles are advanced with increase in speed of the motor and that one of said phase control circuits is operable to produce an output gate signal not simultaneously with the remaining phase control circuits.

2. A speed control system for a polyphase induction motor as claimed in claim 1, in which said pilot generator comprises a converter adapted to produce an EMF proportional to the torque or output of the motor whereby in both positive and negative torque ranges of the motor the speed of the motor can be controlled steplessly with its torque or output value fixed.

3. A speed control system for a polyphase induction moto rhaving a plurality of windings in star connection, said system comprising a plurality of controlled rectifiers corresponding in number to the phases of the motor windings and connected in ring arrangement to the neutral point of the star connection of the motor windings, said controlled rectifiers being adjustable in firing angle to control the speed and other operating conditions of the motor, one of said controlled rectifiers being separately firable to provide a dynamic braking characteristic for the motor without altering the main circuit connection thereof, and gate control means coupled to the rectifiers to fire the same such that the firing phase angles of the rectifiers are retarded with increase of speed of the motor in its positive torque region while in its negative torque region the firing phase angles are advanced with increase of speed of the motor to balance the motor and provide stable operating states at the altered speeds of the motor whereby the motor is furnished with speed-torque characterisics of a shunt character in both said regions.

4. A system as claimed in claim 3 wherein said gate control means comprises conversion circuit means for producing saw tooth wave voltages in synchronization with the power source, a variable speed voltage generator, a pilot generator for producing a voltage proportional to the speed or slip of the motor, said generators being connected in opposed relation to one another and to the conversion circuit means, and phase control circuit means coupled to said rectifiers and to the geneartors to receive an input voltage corresponding to the superposition of the saw tooth waves on the differential potential between the generators for producing output gate signals when the input voltage exceeds a predetermined value to fire said controlled rectifiers.

5. A system as claimed in claim 4 wherein one of said phase control circuit means is operable to produce an output gate signal not simultaneously with the remaining phase control circuit means.

6. A control system for a star-connected polyphase induction motor, comprising a ring connection of controlled rectifiers connected to the primary winding of said motor at the neutral point thereof so that control of said motor is effected by the adjustment of the firing angle of said controlled rectifiers, means for firing a determined one of said controlled rectifiers for thereby obtaining a dynamic brake character for the motor, and means for controlling said firing angle for enabling control of the braking effort.

References Cited
UNITED STATES PATENTS 2,579,574 12/1951 Herchenroeder _____ 318—227
2,876,406 3/1959 Charbonneaux et al. __ 318—227

ORIS L. RADER, *Primary Examiner.*

G. RUBINSON, *Assistant Examiner.*